United States Patent [19]

Tagliaferri

[11] Patent Number: 5,107,737
[45] Date of Patent: Apr. 28, 1992

[54] CUTTER DISC ARBOR PARTICULARLY FOR DIVIDING MACHINES

[75] Inventor: Renzo Tagliaferri, Piacenza, Italy

[73] Assignee: Selco S.r.l., Cresspellano, Italy

[21] Appl. No.: 650,798

[22] Filed: Feb. 5, 1991

[30] Foreign Application Priority Data

Feb. 8, 1990 [IT] Italy .................. 3335 A/90

[51] Int. Cl.⁵ .............................................. B26D 1/12
[52] U.S. Cl. ........................................ 83/665; 83/481;
83/676; 83/698; 144/218
[58] Field of Search ............... 144/218, 223; 83/441,
83/665, 666, 675, 676, 698

[56] References Cited

U.S. PATENT DOCUMENTS 3,908,499 9/1975 Reed ............................ 83/481
4,809,465 3/1989 Mushardt et al. ............. 83/666

FOREIGN PATENT DOCUMENTS 0294536 6/1987 European Pat. Off. .
0324357 1/1989 European Pat. Off. .
1421894 1/1965 France .

Primary Examiner—W. Donald Bray
Attorney, Agent, or Firm—Klauber & Jackson

[57] ABSTRACT

The invention relates to a cutter disc arbor for divider machines having a first rotating body and a first flange on which a cutter is centered. A second rotating body has a second flange facing the first flange. The second flange is movable axially between a first position in which the second flange clamps the blade against the first flange, and a second unclamped position.

9 Claims, 2 Drawing Sheets

CUTTER DISC ARBOR PARTICULARLY FOR DIVIDING MACHINES

BACKGROUND OF THE INVENTION

The present invention relates to a cutter disc arbor for divider machines, trimmers, squarers etc.

As is known, machines of the above indicated type are provided with a cutting or incision unit constituted by a cutter disc arbor and arbor drive means. This essentially comprises two rotating bodies having flanges between which a cutter disc is installed.

The principal problem which is encountered in current arbors relates to the fixing system acting between the rotating bodies and between these and the cutter blade. Such systems involve fixing by means of screws or threaded nuts by which, whenever it is necessary to replace the blade, labour intensive operations are performed needing suitable tools and taking a relatively long time, which has to be considered as down time.

SUMMARY OF THE INVENTION

The object of the present invention is that of providing a blade carrier arbor which will be free from the stated disadvantage and which therefore will provide a blade fixing system which will be practical and require less time.

According to the present invention there is provided a cutter disc arbor particularly for dividing machines, characterised by the fact that it comprises:
- a first substantially cylindrical hollow rotating body having at one axial end a first annular flange on which the said blade is centred;
- a second substantially cup-shape rotating body, coaxial with the said first body, and having at a first axial end a second annular flange which in use faces the said first flange;
- drive means for driving the said first body to rotate about its own longitudinal axis;
- a member angularly uncoupled from and axially coupled to the said second body, translatable axially between a first position in which the said second flange clamps the said blade against the said first flange and a second position in which the said second body is located at a pre-determined distance from the said first body, and having a third body carried by the said second body and disengageable from the other portions of the said member when this is in the said second position; and
- means for controlling the translation of the said member.

BRIEF DESCRIPTION OF THE DRAWINGS

For a better understanding of the present invention a preferred embodiment thereof will now be described, purely by way of non limitative example, with reference to the attached drawings, in which.

DETAILED DESCRIPTION OF THE INVENTION

Figure 1:
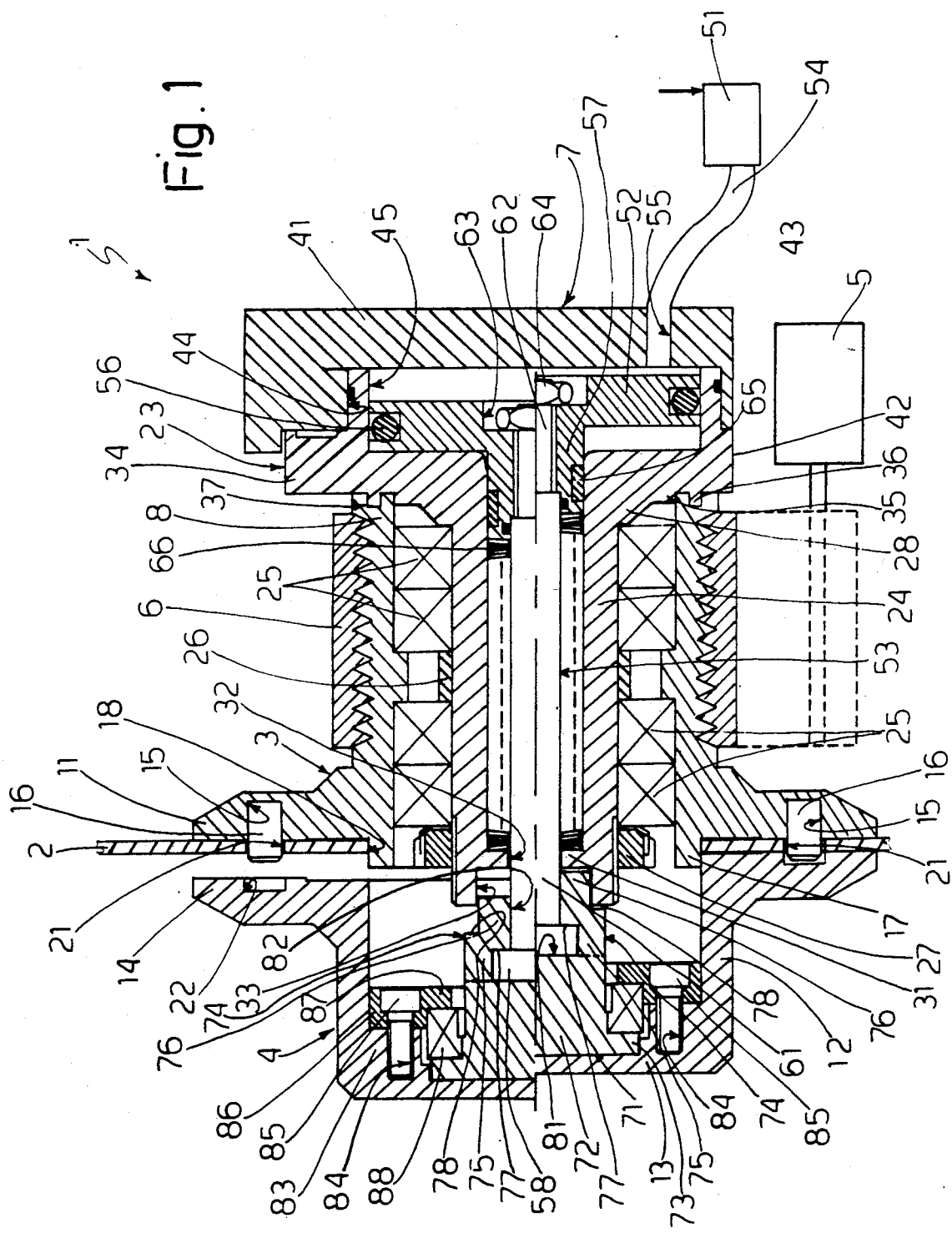
FIG. 1 is a longitudinal section through the cutter disc arbor.

As illustrated in FIG. 1, an arbor generally indicated with reference numeral 1 is adapted to carry a cutter disc 2 for a divider machine, trimmer, squarer, or other machine of the same type. The arbor 1 comprises two coaxial rotating bodies 3 and 4 between which the blade 2 is installed, a motor 5 (schematically illustrated) adapted to drive the body 3 to rotate, via a belt 6, about the longitudinal axis thereof, and a pneumatic mechanical device 7 acting to cause release of the body 4 from the body 3 to be able to effect, in a simple manner, the replacement of the blade 2.

The body 3 has an internally hollow cylindrical portion 8 and an annular flange 11 extending from a first axial end of this portion 8. The body 4 is substantially cup-shape and has a cylindrical internally hollow portion 12 closed at a first axial end by a wall 13 and an annular flange 14 extending from a second axial end of the portion 12 facing the flange 11. As already described, the belt 6 drives the body 3 in rotation and in particular the belt 6, or rather its internal surface, cooperates with the outer surface of the portion 8; these surfaces are shaped as illustrated in FIG. 1, to achieve a saw tooth coupling. Uniformly distributed around an outer peripheral ring of the face of the flange 11 facing towards the flange 14, is an array of blind holes 15 engaged by respective cylindrical pins 16 which extend beyond the respective holes 15. Also from the said face of the flange 11 but on a smaller diameter, an annular projection 17 extends towards the body 3 coaxially of the portion 8. The blade 2 has a central through hole 18 which in use is engaged by the projection 17 which therefore represents the blade centring member by which the blade 2 is centred on the body 3. Uniformly distributed around an intermediate circle of the blade 2 there are a plurality of through holes 21 engaged by the pins 16.

As will be seen more clearly hereinbelow the body 4, by means of the action of the device 7, is translatable between a position (illustrated in the lower half section of FIG. 1) in which the blade 2 is clamped between the flanges 11 and 14, and a position (illustrated in the upper half section of FIG. 1) in which the blade 2 is released and in which the body 4 can be totally disconnected from the arbor 1 thus permitting the removal and replacement of the blade 2. In the clamping position the body 4 is drawn towards the body 3 and the flange 14 presses the blade 2 against the flange 11. In this clamping position the pins 16 extend into an annular groove 22 formed on the face of the flange 14 facing towards the flange 11, and the projection 17 engages the portion 12 naturally in correspondence with the flange 14.

Figure 2:
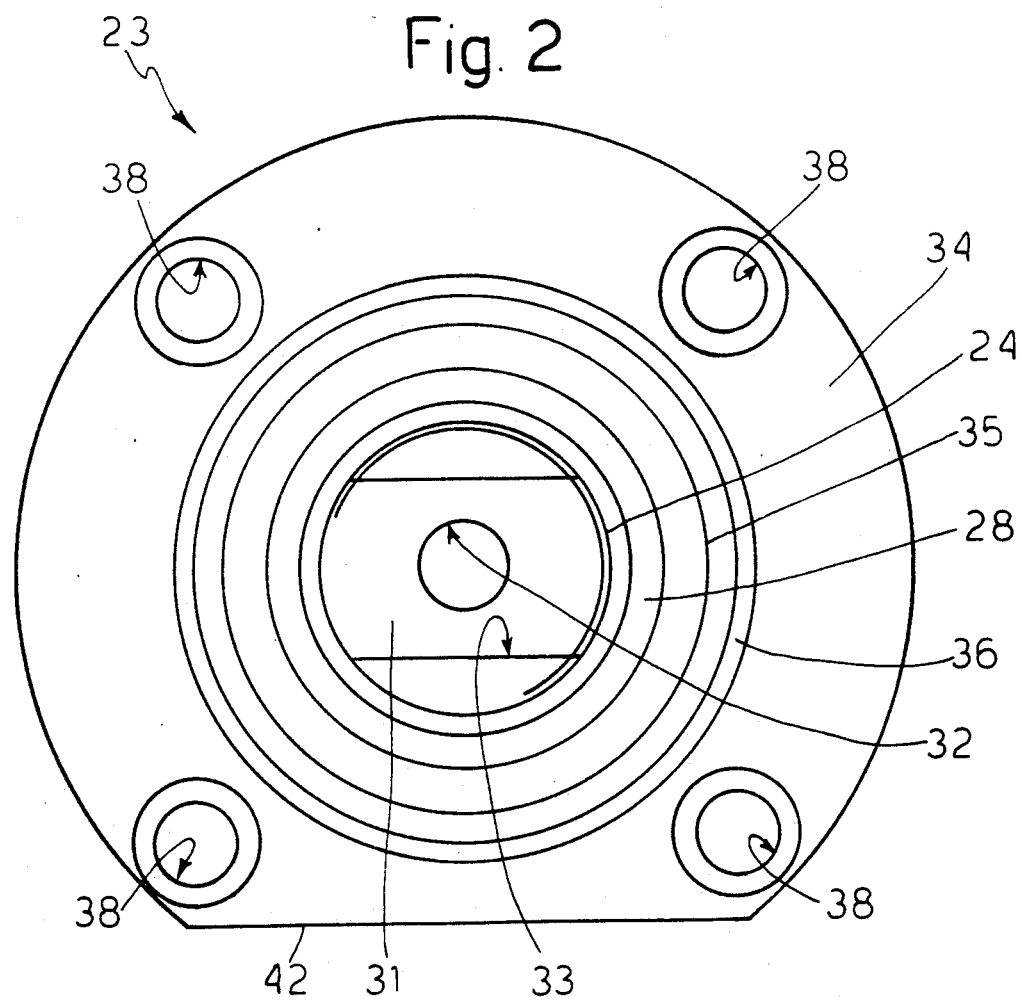
FIG. 2 is a front view of a first component of the arbor of FIG. 1.

As illustrated in FIGS. 1 and 2 the arbor 1 comprises a cylindrical fixed body 23 coaxial with the body 3. It is to be noted that FIG. 2 is a front view of this body 23 removed from the arbor 1. The body 23 comprises a cylindrical, internally hollow portion 24 installed, with the interposition of two pairs of bearings 25 separated by a spacer ring 26, within the interior of the portion 8. The portion 24 has a first axial end which extends towards the body 4 beyond the projection 17. The outer surface of this end of the portion 24 is threaded and onto this threaded portion is screwed a nut 27 against which engages a bearing 25 of the pair closest to the body 4. At a second axial end of the portion 24 there is formed an outer annular shoulder 28 against which engages a bearing 25 of the pair furthest from the body 4. At the threaded end of the portion 24 on the interior of this is formed a small wall 31 with a central through hole 32. Still at this end of the portion 24, beyond the wall 31, there is formed a diametral opening 33 having flat faces as illustrated in FIG. 2. At the said second axial end of the portion 24 the body 23 includes, coaxially of the portion 24, an annular flange 34 on the face of which facing towards the flange 11 there is formed an annular shoulder 35 which lies within the corresponding axial end of the portion 8 and, on a circle outwardly of this shoulder 35, an annular projection 36 which lies within an annular axial grove 37 formed on the face of this end of the portion 8. The flange 34 has a plurality of through holes 38 (FIG. 2) in use engaged by respective screws not illustrated which secure the body 23 to a fixed wall 41. The flange 34 further has a facet 42 which constitutes a reference for the fixing of the body 23 to the wall 41. Coaxially from the face of the flange 34 opposite that facing towards the flange 11 extends an annular projection 43 which engages a cylindrical cavity 44 defined on the wall 41. Between the flange 34 and the wall 41 there is thus defined a cylindrical chamber 45.

With reference to FIG. 1, the device 7 includes a pneumatic installation 51 (schematically illustrated), a cylindrical piston 52 adapted to translate axially along the chamber 45, and a piston rod 53 fixed to the piston 52 and adapted to draw the body 3 into translation in the previously described manner. The system 51 is provided with a duct 54 in communication with the chamber 45 through a hole 55 formed in the wall 41. On the cylindrical lateral surface of the piston 52 there is formed an annular seat for a sealing ring 56. From the face of the piston 52 facing towards the flange 11 extends a hollow cylindrical internally threaded portion 5 which extends coaxially within the portion 24 of the body 23. The piston rod 53 has, in succession, a cylindrical head 58 lying in the space defined in the interior of the body 4, a cylindrical leg 61 which is coaxially within the portion 24 and which therefore traverses the hole 32, and a threaded portion 62 which is screwed into the portion 57 and which extends into the interior of a cylindrical opening 63 formed on the face of the piston 52 facing towards the wall 41. In this opening 63, the portion 62 of the piston rod 53 has a nut 64 which is screwed on for greater fixing security between the piston rod 53 and the piston 52, and which remains within the opening 63. On the outer lateral surface of portion 57 there is formed an annular seat for a guide ring 65 which guides the translation of this portion 57 along the portion 24. Within this and around the leg 61 there is installed an array of cup springs 66 which press at one end against the inner face of the small wall 31 and at the other end on the face of the portion 57. These springs 66 are pre-loaded and oppose translation of the u it comprising the piston 52 and the piston rod 53 towards the body 4.

Figure 3:
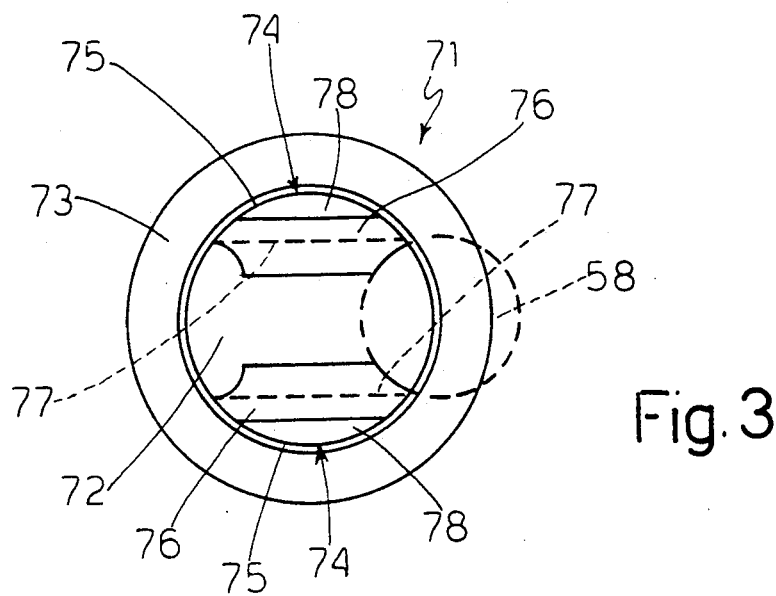
FIG. 3 is a rear view of the second component of the arbor of FIG. 1.

With reference to FIGS. 1 and 3, within the body 4 there is coaxially fitted a body 71 which transmits the translation movement from the piston rod 53 to the body 4 and which is angularly uncoupled from the body 4 in such a way that a rotation of this does not involve a rotation of the piston rod 53 and therefore of the piston 52. It is to be noted that FIG. 3 is a rear view of this body 71 removed from the arbor 1. The body 71 has a solid cylindrical portion 72 at a first axial end of which there is formed an annular flange 73. Two small parallel plates 74 extend from the corresponding face at a second axial end of the portion 72 towards the portion 24. Each small plate 74 includes a first section 75 which extends from the portion 72 and has an inner face (facing towards the section 75 of the other small plate 74) defined on one plane and an outer face defined on a semi-cylindrical surface continuous with the cylindrical surface of the portion 72. The small plate 74 further includes a second section 76 with both its faces being flat but offset with respect to the section 75. The distance between the sections 75 of the two plates 74 is greater than that between the sections 76 thereof so that each small plate 74 on its face facing towards the other small plate 74 has a respective surface 77 facing towards the portion 72, whilst on the opposite face a respective surface 78 faces towards the portion 24 of the body 23. The sections 75, the corresponding face of the portion 72, and the surfaces 77 delimit a seat 81 which in use is engaged by the head 58 of piston rod 53, whilst between the internal faces of the sections 76 there is defined a passage 82 traversed by the leg 61. The head 58 of the piston rod 53 engages against the surfaces 77. The lateral edges of the internal faces of the small plates 74 are arcuately bevelled with a circumference equal in diameter to that of the head 58 in such a way as to constitute a reference for assembly of the body 71 onto the head 58. On the internal face of the wall 13 there is defined, in a peripheral ring, an annular portion 83 in which there is formed a plurality of uniformly distributed threaded blind holes 84 the respective axes of which are parallel to the axis of the body 4. On this portion 83, by means of screws 85 screwed into the holes 84, there is fixed a ring 86 having an internal annular flange 87. Between this and the flange 73 there is fitted a thrust bearing 88. There is thus created a coupling for axial translation and an uncoupling for rotation between the body 71 (and therefore the assembly comprising the piston rod 53 and the piston 52) and the body 4.

For assembling the body 4 into the arbor 1 this body 4 is brought to a position facing the body 3 but offset with respect to this. The body 4 is advanced until the head 5 of the piston rod 53 lies in correspondence with the seat 81. Now the body 4 is translated laterally until it is brought into axial alignment with the body 3 thus making the head 58 engage the seat 81 and the leg 61 the passage 82. All this is possible only when compressed air is introduced into the chamber 45 which, against the action of the springs 66, displaces the piston 52 towards the flange 34 (illustrated in the upper half section of FIG. 1), so that the piston rod 53 also translates towards the exterior of the body 3. It is to be noted that during the lateral translation of the body 4 the sections 66 engage the opening 33. Upon exhausting the compressed air from the chamber 45, for example by connecting this to the atmosphere, the piston 52 is translated towards the wall 41 by the action of the springs 66, therefore also withdrawing the piston rod 53 which in turn draws the body 71 and the body 4 with it. The sections 76 of the body 71 totally engage the opening 33, the surfaces 78 approach the end of the portion 24, whilst the flange 14 presses the blade 2 against the flange 11 as illustrated in the lower half section of FIG. 1. In the clamping position just described the motor 5 can be driven which, by means of the belt 6, drives the body 3 to rotate and with it the blade 2 and the body 4, this latter because of the force exerted by the springs 66 and by the installation of the bearings 88. Naturally, for replacement of the blade 2 it is necessary to stop the motor 5, introduce compressed air into the chamber 45, laterally extract the body 4 from the head 58, and finally withdraw the blade 2.

From what has been described, the numerous advantages achieved by the present invention will be evident.

In particular, the clamping of the blade between the rotating bodies of the arbor is achieved by the action of spring means and therefore without any type of screw or nut fixing. This allows the replacement of the blade by means of a simple pneumatic control to overcome the said springs and without any need to utilise appropriate tools. It will therefore appear evident that this replacement can be effected quickly with all of the advantages which derive from that and translate into an increase in the utilisation time of the machine provided with such arbor. Finally, the constructional simplicity of the arbor 1 is to be underlined which therefore makes it of low production cost.

Finally, it is clear that the arbor described and illustrated here can have modifications and variations introduced thereto without by this departing from the protective ambit of the present invention.

I claim:

1. An arbor for a cutter disc comprised of:
   a first substantially cylindrical hollow rotating body having at a first axial end a first annular flange on which a blade is centered;
   a second substantially cylindrical cup shaped rotating body coaxial to said first body and having at a first axial end a second annular flange facing said first flange;
   drive means for driving said first body about its longitudinal axis;
   an angularly uncoupled member which is axially coupled to said second body, and which is adapted to translate axially between a first position in which said second flange clamps the blade against said first flange, and a second position in which said second body is located at a pre-determined distance from said first body;
   a third body carried by said second body and disengageable from the other portions of the member when in the second position; and
   means for controlling translation of the said member.

2. An arbor according to claim 1 wherein said member comprises:
   a piston slidable within a chamber formed close to a second axial end of said first body;
   a piston rod having a head affixed thereto and which coaxially traverses said first body and said third body,
   said third body being further comprised of a seat for housing the head of the piston rod.

3. An arbor according to claim 2 further comprised of bearings and a fourth cylindrical body, said first body being fitted, with the interposition of said bearings within which said piston rod is slidable;
said fourth body having, outside the second end of the first body, a third annular flange which delimits, with a fixed wall, the said chamber.

4. An arbor according to claim 3 wherein said fourth body has an interior which houses a spring means adapted to resist translation of the member from the first to the second position.

5. An arbor according to claim 2 wherein said second body is further comprised of a closure wall;
   a ring fixed to said second body;
   a fourth annular flange extending from a first axial end of the third body, and
   a thrust bearing (88) fitted between said ring and said fourth flange.

6. An arbor according to claim 5 wherein at a second axial end of the third body there is formed a seat for the head of the piston rod; said seat being laterally open in such that it is possible, by translating the said second body laterally, to disengage said head therefrom.

7. An arbor according to claim 6 wherein said seat is defined between two small plates the free ends of which, in use, engage an opening formed at a second axial end of the said fourth body.

8. An arbor according to claim 2 wherein said means for controlling the translation of the said member is adapted to introduce a fluid under pressure to the interior of said chamber.

9. An arbor for a cutting disc comprised of:
   (a) a first substantially cylindrical hollow rotating body having a longitudinal axis, a first axial end and a second axial end, said first axial end having a first annular flange suited for centering a cutting disc thereon;
   (b) a second substantially cylindrical cup-shaped rotating body coaxial to the first body, and having a first axial end and a second axial end, said first axial end having a second annular flange facing the first annular flange;
   (c) drive means for driving the first body along its longitudinal axis;
   (d) a member angularly uncoupled and axially coupled to the second body, said member being adapted to translate axially between a first position and a second position,
   said first position being a position wherein the second flange clamps the cutting disc against the first flange,
   said second position being a position wherein the second body is at a pre-determined distance from the first body;
   (e) a third body carried by the second body, which is disengageable when said member is in the second position, and
   means for controlling translation of said member.

* * * * *